April 8, 1924.

R. MULHOLLAND

ATTACHMENT FOR BRAKES

Original Filed Dec. 2, 1922

1,489,543

Inventor
ROBERT MULHOLLAND

Attorney

Patented Apr. 8, 1924.

1,489,543

UNITED STATES PATENT OFFICE.

ROBERT MULHOLLAND, OF FORT BRAGG, CALIFORNIA.

ATTACHMENT FOR BRAKES.

Application filed December 2, 1922, Serial No. 604,542. Renewed February 21, 1924.

*To all whom it may concern:*

Be it known that I, ROBERT MULHOLLAND, a citizen of the United States, residing at Fort Bragg, in the county of Mendocino and State of California, have invented certain new and useful Improvements in Attachments for Brakes, of which the following is a specification.

This invention relates to attachments for brakes, and more particularly to means for retaining a brake shoe in desired position.

An object of the invention is the provision of means for retaining a brake shoe spaced from a wheel when the brake is released to prevent unnecessary wear on the shoe.

In the usual construction of locomotive brakes, the brake shoe head is pivotally mounted on a hanger and the upper end of the head, which is lighter, tends to swing toward the locomotive wheel when the brake is released, thus causing unnecessary wear of the brake shoe.

In the present invention, I provide means for retaining the upper portion of the head in proper position, so that the surface of the brake shoe is substantially parallel to the wheel at all times. In the preferred embodiment of the invention, I employ a bar secured to the brake shoe head having a plurality of rack teeth, one of which is adapted to engage a slot in a second member carried by the hanger so that the brake shoe is held in a given position on its pivot.

Figure 1:
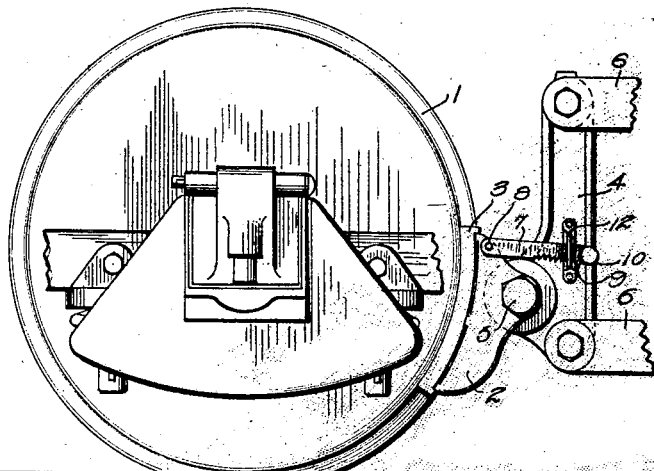
Figure 2:
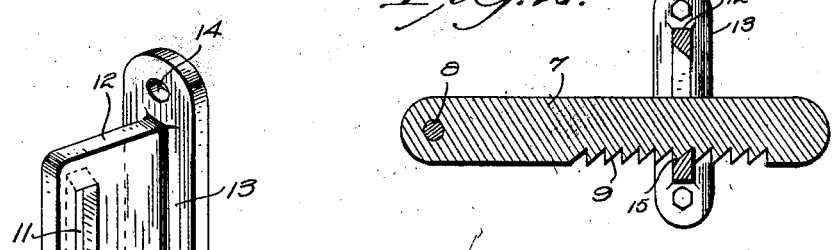
Figure 3:
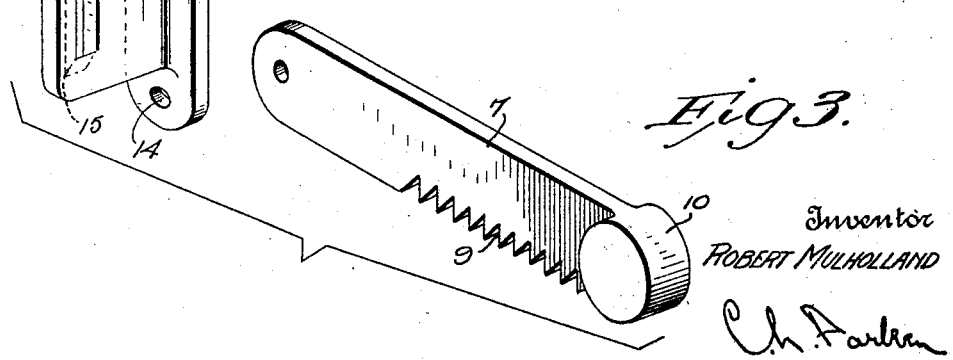

In the accompanying drawings, I have shown one embodiment of the invention. In this showing:

Figure 1 is a side elevation of a locomotive wheel and brake showing the invention applied, Figure 2 is a detail view of the toothed rod and slotted member forming the subject matter of the invention, and, Figure 3 is a perspective view thereof.

Referring to the drawings, the reference numeral 1 designates a locomotive wheel which may be formed in any desired manner. This wheel is adapted to be engaged by a brake consisting of a brake shoe head 2, which carries a brake shoe 3 which is adapted to engage a portion of the wheel. The brake shoe head is secured to a hanger 4 by means of a bolt or pin 5, forming a pivot. Brake rods 6 are secured to the hanger to permit operation of the brake when desired.

It will be apparent from an inspection of Figure 1 of the drawings that the weight of the portion of the brake shoe head beneath the pivot 5 is greater than the weight of the portion above the pivot and that the brake shoe head has a tendency to swing on its pivot in a counter clockwise direction. This tendency causes the upper end of the brake shoe to engage the wheel, causing uneven wear of the brake shoe.

To retain the upper end of the brake shoe in proper position so that the entire surface of the brake shoe is substantially parallel to the portion of the wheel to be engaged, I provide an attachment consisting of a bar or rod 7, secured to the brake shoe head by means of a pin 8. This bar is provided with a plurality of teeth 9 on its lower surface and with a weighted end 10. The bar is adapted to be passed through a slot 11, formed in a plate 12. This plate extends outwardly from the brake hanger at an angle thereto. It is provided with a flange 13, having openings 14 for the reception of suitable fastening elements whereby the slotted plate is secured to the hanger. As shown, the lower wall of the slot is cut at an incline, forming a tooth 15 adapted to engage one of the teeth 9.

In operation, the device is adjusted by placing the weighted end 10 of the rod 7 against the plate 12 and then applying the brakes. This will cause the upper end of the brake shoe to move away from the wheel and the tooth 15 will enter one of the spaces between the teeth 9. The brake shoe head is then properly adjusted to prevent the top end of the brake shoe from engaging the surface of the wheel when the brakes are released. The engagement of the tooth 15 in one of the recesses of the bar 7 retains the brake shoe head at the angle at which it is originally set with the brake shoe substantially parallel to the engaged surface of the wheel and when the entire brake shoe is moved away from the wheel by exerting a pull on the rods 6 to the right in Figure 1 of the drawings, every portion of the shoe will be brought out of contact with the wheel surface.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An attachment for brakes, comprising an arm secured to the upper portion of the brake shoe head and extending therefrom, said arm being provided with a plurality of teeth on its lower face, a slotted plate secured to the brake hanger, said plate being provided with a tooth in said slot to engage one of the teeth on said arm, and means for retaining said teeth in engagement with each other.

2. An attachment for brakes, comprising an arm secured to the upper portion of the brake shoe head and extending therefrom, said arm being provided with a plurality of teeth on its lower face, a slotted plate secured to the brake hanger, said plate being provided with a tooth in said slot to engage one of the teeth on said arm, and a weight mounted on the outer end of said arm to retain said teeth in engagement.

In testimony whereof, I affix my signature in presence of two witnesses.

ROBERT MULHOLLAND.

Witnesses:
J. A. PETTES,
W. W. SALSIG.